United States Patent
Shen et al.

(10) Patent No.: US 7,923,139 B2
(45) Date of Patent: Apr. 12, 2011

(54) SECONDARY BATTERY INCLUDING A SAFETY DEVICE

(75) Inventors: Xi Shen, Guangdong (CN); Lei Han, Guangdong (CN)

(73) Assignee: BYD Company Limited, Guangdong (CN)

(*) Notice: Subject to any disclaimer, the term of this patent is extended or adjusted under 35 U.S.C. 154(b) by 183 days.

(21) Appl. No.: 12/159,576

(22) PCT Filed: Dec. 28, 2006

(86) PCT No.: PCT/CN2006/003644
§ 371 (c)(1),
(2), (4) Date: Dec. 1, 2008

(87) PCT Pub. No.: WO2007/076693
PCT Pub. Date: Jul. 12, 2007

(65) Prior Publication Data
US 2009/0148766 A1    Jun. 11, 2009

(30) Foreign Application Priority Data
Dec. 30, 2005    (CN) .......................... 2005 1 0121325

(51) Int. Cl.
*H01M 2/00*    (2006.01)
(52) U.S. Cl. ............................. 429/62; 429/53; 429/56
(58) Field of Classification Search .................. 429/53, 429/54, 55, 56, 62
See application file for complete search history.

(56) References Cited

U.S. PATENT DOCUMENTS

| | | | | |
|---|---|---|---|---|
| 4,690,879 A | * | 9/1987 | Huhndorff et al. | 429/61 |
| 6,080,506 A | | 6/2000 | Davis et al. | |
| 6,139,986 A | * | 10/2000 | Kurokawa et al. | 429/61 |
| 6,242,126 B1 | * | 6/2001 | Mori et al. | 429/53 |

FOREIGN PATENT DOCUMENTS

| | | |
|---|---|---|
| CN | 1200199 A | 11/1998 |
| CN | 1288269 A | 3/2001 |
| DE | 4115267 A1 | 11/1992 |
| JP | 2002-184390 A | 6/2002 |
| KR | 200421799 A | 3/2004 |

OTHER PUBLICATIONS

PCT International Search Report for PCT/CN2006/003644, mailed Apr. 12, 2007, 3 pages.

* cited by examiner

*Primary Examiner* — Dah-Wei D Yuan
*Assistant Examiner* — Zachary Best
(74) *Attorney, Agent, or Firm* — Blakey, Sokoloff, Taylor & Zafman LLP

(57) ABSTRACT

A secondary battery provided with a safety element (16) comprising a conductive current interrupter (161) and an insulation holder (162) at thereof bottom. By safety element provided at the bottom of the battery, either sealed formation technology or open-formation technology is allowed in battery formation processing, and any other sealing method is selectable as well as pressing sealing.

10 Claims, 3 Drawing Sheets

SECONDARY BATTERY INCLUDING A SAFETY DEVICE

CROSS-REFERENCE TO OTHER APPLICATIONS

This is a National Phase of International Application No. PCT/CN2006/003644, filed on Dec. 28, 2006, which claims priority from Chinese Patent Application No. 200510121325.6, filed on Dec. 30, 2005.

FIELD OF THE INVENTION

The present invention relates to a secondary battery, particularly to a secondary battery provided with a safety device at the bottom thereof.

BACKGROUND OF THE INVENTION

The secondary battery has already been widely applied as a high capacity power supply device in various fields. When a common secondary battery is operated under abnormal conditions, such as mechanical compression, impact, high temperature, short circuit, or overcharge, etc., a large amount of heat will be accumulated instantly inside the battery, and the internal pressure of the battery will be increased sharply. This could lead to the battery smoking, catching fire, or exploding, and thus cause an accident resulting in major property loss or a hazard to personnel safety. Therefore, there is a need for safety measures for the secondary battery.

The conventional secondary battery is usually provided with no special safety device, and only relies on an external protection circuit for safety protection, which restricts the expansion of application scope of the battery. For satisfying the requirement for safety of the battery, some designers engrave or press a groove with a certain shape as a weak portion on the surface of the battery, and the groove has relatively lower resistance to pressure than that of other portions of the surface of the battery; thus when the internal pressure rises in case of the abnormal operation of the battery, the groove will be damaged first, so as to avoid safety accidents like explosion or catching fire. But due to the restriction to the material of the surface of the battery and the fabrication process of the groove, it is difficult to machine the groove, and the uniformity of the thickness of the groove can be hardly ensured, thus it is extremely difficult to fabricate a groove with an uniform thickness corresponding to a preset safety threshold value of the internal pressure of the battery which can ensure the groove may be damaged when the internal pressure of the battery reaches the preset safety threshold value.

Presently the commercial cylindrical lithium ion battery usually comprises a current interrupting device (CID) or a positive temperature coefficient thermosensitive element (PTC) between the anode tab and the anode terminal of the battery. When the battery is in an abnormal operation state, the internal pressure or temperature of the battery rises to actuate the safety device and thus avoid accidents. But these two designs have disadvantages as follows:

1. When the battery carries out a high-rate discharge, its own temperature will significantly rise to quickly start the PTC, and the battery cannot work normally; therefore the application in a high-rate battery is restricted.
2. The existing current interrupting devices are all mounted at the anode end (the open end of the battery casing); since the device needs pressure to start, the sealing is required, thus the battery can only be formed by sealed formation process; and the internal pressure inside the finished battery is high, which brings unsafe factors for the battery.
3. Since the existing current interrupting devices are all mounted at the anode end (the open end of the battery casing), an insulation material is required to isolate the anode and cathode of the battery to avoid short circuit, and the device requires a support part in the battery (otherwise the device can not be used normally), thus only the pressing sealing process can be adopted for sealing the existing batteries; the battery produced by the process has a problem of electrolyte leakage which leads to environment pollution and shorter service life of the battery.

SUMMARY OF THE INVENTION

An object of the present invention is to provide a secondary battery provided with a safety device at the bottom of the battery.

To achieve the object, the present invention provides a secondary battery, which includes a cylindrical casing, and an electrode core and an electrolyte accommodated and sealed in the casing. The bottom end of the casing is closed, and the other end of the casing is sealed by an end cover after the electrode core and the electrolyte are filled. The electrode core comprises an anode plate, a cathode plate, an anode tab and a cathode tab, and a safety device is mounted between the inner surface of the bottom of the casing and the electrode core. An insulation member is arranged between the safety device and the electrode core. The safety device comprises a conductive current interrupting member and an insulation holding member with an appropriate height. The current interrupting member comprises a support portion and an assembly welding portion. The support portion is arranged to support the current interrupting member on the holding member. The assembly welding portion of the current interrupting member of the safety device is welded to the inner surface of the bottom of the casing. One of the anode tab and the cathode tab of the electrode core is electrically connected with the support portion of the current interrupting member of the safety device, and an insulation material is provided between the wall of the casing and the anode plate or cathode plate which has the same polarity as that of the one of the anode tab and the cathode tab.

In the secondary battery according to the present invention, the conductive current interrupting member of the safety device is supported on the holding member, and the assembly welding portion of the current interrupting member is welded to the inner surface of the bottom of the casing. When the internal pressure of the battery rises, the main body of the current interrupting member is under a tension force. Once the tension force exceeds a certain degree, the main body of the current interrupting member is broken, or the welding structure between the assembly welding portion of the current interrupting member and the bottom of the casing is damaged, so that the current interrupting member is separated from the bottom of the casing, so as to achieve the current interruption, and avoid continuous rise of the internal pressure and prevent from safety accidents.

In the secondary battery according to the present invention, the safety device is fixedly held between the bottom of the cylindrical casing and the electrode core, the support portion of the current interrupting member of the safety device supports the current interrupting member on the holding member of the safety device, and the assembly welding portion of the current interrupting member of the safety device is welded on the inner surface of the bottom of the cylindrical casing. Arranging the safety device on the bottom of the battery, the battery formation process will not be restricted, and either the open formation process or the sealed formation process may be used. The sealing method will not be restricted, and the sealing can be realized by other sealing methods besides pressing sealing, such as laser welding, to avoid the electrolyte leakage.

The current interrupting member may be supported on the holding member by the support portion of the safety device in a manner that the support portion is fixed on the holding member to support the current interrupting member on the holding member or the support portion is tightly held between the holding member and the insulation member to support the current interrupting member on the holding member. Preferably the support portion is tightly held between the holding member and the insulation member.

The current interrupting member may be in a reversed L-shaped (i.e. the longitudinal cross section is in a reversed L-shaped), in this case, the horizontal portion of the reversed L-shaped current interrupting member is used as the support portion to be tightly held between the holding member and the insulation member, and the free end of the upright portion of the reversed L-shaped current interrupting member is used as the assembly welding portion to be welded on the inner surface of the bottom of the casing. Alternatively the current interrupting member may be in a L-shaped (i.e. the longitudinal cross section is in a L-shaped), in this case, the free end of the upright portion of the L-shaped current interrupting member is used as the support portion, and the horizontal portion of the L-shaped current interrupting member is used as the assembly welding portion. Preferably, for the reversed L-shaped current interrupting member and the L-shaped current interrupting member, the assembly welding portion is welded approximately in the center of the inner surface of the bottom of the casing.

The safety device may be provided with a plurality of L-shaped or reversed L-shaped current interrupting members, or a combination of the two.

The current interrupting member may be a groove-shaped structure, the outer surface of the bottom of the groove-shaped structure is used as the assembly welding portion to be welded on the inner surface of the bottom of the casing, and the groove wall of the groove-shaped structure or the support arm extended outward from the groove wall is used as the support portion. Preferably, the support arm of the groove-shaped current interrupting member is the top end portion of the groove wall folded toward the outer space of the groove-shaped structure to a horizontal position.

The current interrupting member may be a hopper-shaped structure, the flange extended outward from the main body of the current interrupting member is used as the support portion, and the outer surface of the bottom of the main body of the current interrupting member is used as the assembly welding portion. Preferably, the flange of the hopper-shaped current interrupting member is the top end portion of the hopper wall folded toward the outer space of the hopper-shaped structure to a horizontal position.

For the hopper-shaped current interrupting member, a through hole may be provided in the hopper wall of the main body of the current interrupting member, so that the inner surface of the bottom of the casing welded with the assembly welding portion of the current interrupting member may be directly pressed when the internal pressure of the battery rises, and the inner surface of the bottom of the casing also exerts tension action to the current interrupting member. Thus, the hopper wall of the current interrupting member is under a tension force due to the increase of the internal pressure of the battery, and at the same time, the inner surface of the bottom of the casing welded together with the assembly welding portion exerts larger tension force to the current interrupting member, and the sensitivity of the current interrupting member to the increase of the internal pressure of the battery will be improved, so as to achieve good current interrupting and safety protection functions.

The thickness of the support portion is no less than 0.2 mm, and the thickness of the assembly welding portion is 0.05-0.3 mm.

The holding member may be a platform structure with a supporting function, or a plurality of holding members may be adopted. Preferably, the holding member is an annular structure, an appropriate height is maintained between the two end surfaces of the annular structure of the holding member, and the assembly welding portion of the current interrupting member is welded on the inner surface of the bottom of the casing through the cavity of the annular structure of the holding member.

The current interrupting manner of the safety device may be in various designs as needed. When the welding strength between the assembly welding portion of the current interrupting member and the inner surface of the bottom of the casing is larger than the tensile strength of the current interrupting member, and the internal pressure of the battery rises to a preset value, the main body of the current interrupting member will be broken firstly so as to interrupt the current loop inside the battery, and the welding structure between the assembly welding portion of the current interrupting member and the inner surface of the bottom of the casing is not damaged. When the welding strength between the assembly welding portion of the current interrupting member and the inner surface of the bottom of the casing is smaller than the tensile strength of the current interrupting member, and the internal pressure of the battery rises to a preset value, the welding structure between the assembly welding portion of the current interrupting member and the inner surface of the bottom of the casing will be damaged, and the current interrupting member is separated from the inner end surface of the casing so as to interrupt the current loop inside the battery, at this point the main body of the current interrupting member is not broken.

The secondary battery according to the present invention is provided with the safety device at the bottom thereof, with a simple structure and no restriction to the formation process and the sealing method of the battery.

BRIEF DESCRIPTION OF THE DRAWINGS

The embodiment of the present invention will be described with reference to the drawings.

DETAILED DESCRIPTION OF THE EMBODIMENTS

Embodiment 1

Figure 1:
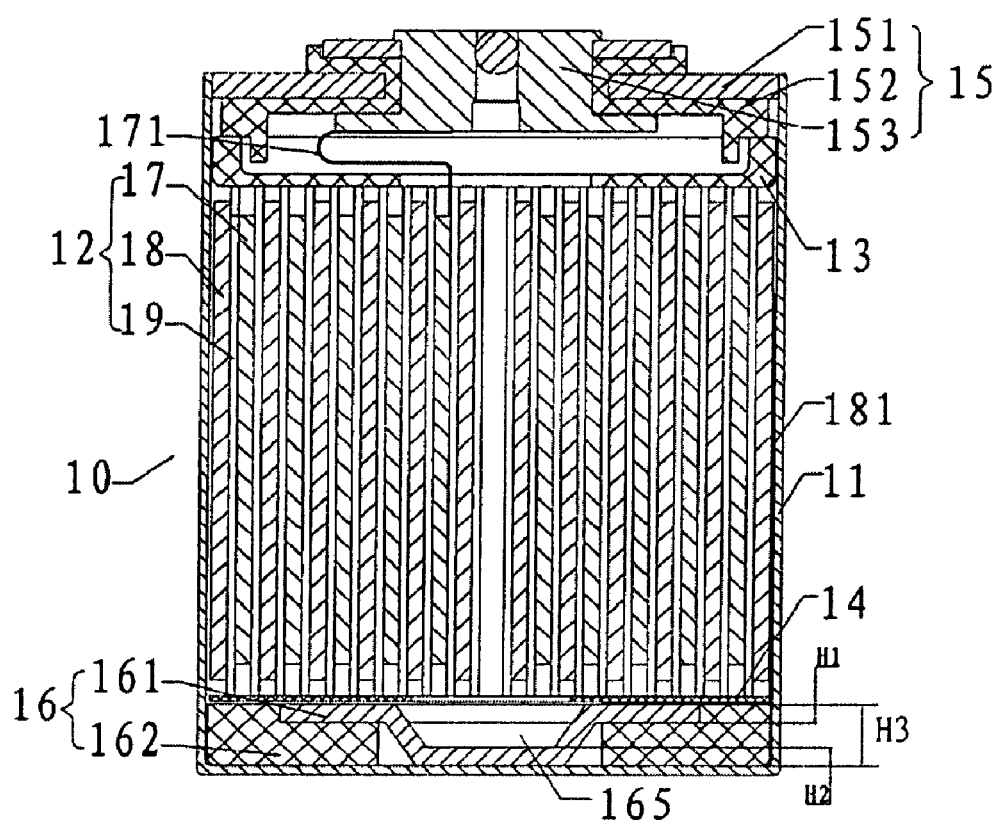
FIG. 1 is a cross sectional view of the secondary battery according to an embodiment of the present invention.
Figure 2:
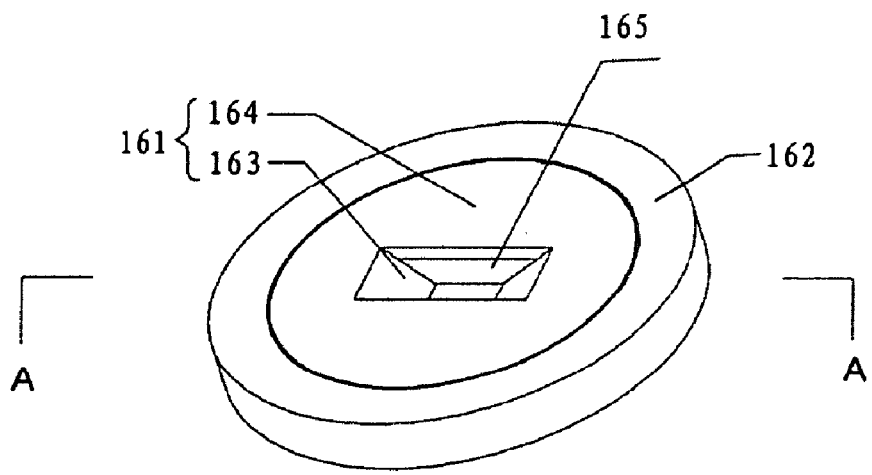
FIG. 2 is a perspective view of the safety device 16 in FIG. 1.
Figure 3:
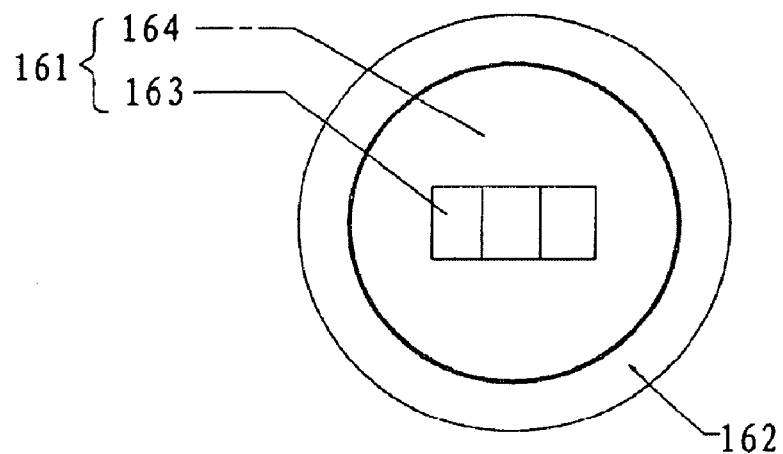
FIG. 3 is a top view of the safety device 16 in FIG. 2.
Figure 4:
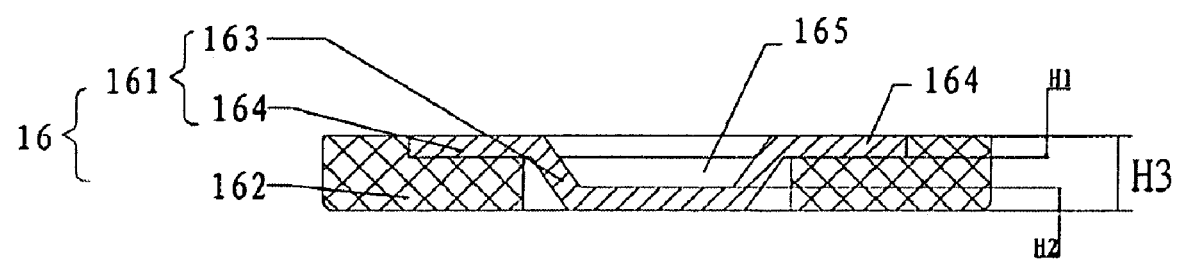
FIG. 4 is a cross sectional view taken along a line A-A in FIG. 2

FIGS. 1-4 show the secondary battery according to an embodiment of the present invention. The secondary battery comprises a safety device 16, a casing 11, an electrode core 12, a top spacer ring 13, a bottom spacer ring 14, a cover plate assembly 15, and an electrolyte (not shown in the drawings). The casing 11 made of metallic material is in a shape of hollow cylinder, the bottom of the casing is integrated with the wall of the casing, and the upper end of the casing is closed by the cover plate assembly 15. The cross section of the inner cavity of the casing 11 and the cross section of the safety device 16 are both circular with an equal radii. The top spacer ring 13 and the bottom spacer ring 14 are made from insulation material.

The safety device 16 is mounted between the bottom end of the casing 11 and the bottom spacer ring 14. The safety device 16 comprises a conductive hopper-shaped current interrupting member 161 and an annular insulation holding member 162 for supporting the current interrupting member 161. The cross section of the inner cavity of the casing 11 and the cross section of the holding member 162 are both circular with an equal radii.

The current interrupting member 161 comprises a hopper-shaped main body 163 and a circular sheet-shaped support portion 164 extended from the upper edge of the hopper-shaped main body 163 in a horizontal direction. An assembly welding portion is located at the lower surface of the bottom of the hopper-shaped main body 163. The lower surface of the bottom of the hopper-shaped main body 163 of the current interrupting member 161 is welded on the inner surface of the bottom of the casing. For improving the sensitivity of the safety device 16 to the increasing of the internal pressure of the battery, an opening 165 is provided in the wall of the hopper-shaped main body 163 of the current interrupting member 161.

The holding member 162 is in an annular structure; a groove with a size and shape matching with the support portion 164 is provided in the upper surface of the holding member 162; the groove has a depth equal to the thickness H1 of the support portion 164; the height H3 of the holding member 162 is equal to the vertical distance between the upper surface of the support portion 164 and the lower surface of the bottom of the hopper-shaped main body 163. The support portion 164 of the safety device 16 is tightly held between the bottom of the casing and the bottom spacer ring.

The thickness H1 of the support portion 164 is no less than 0.2 mm, and the thickness H2 of the current interrupting member 161 at the assembly welding portion is 0.05-0.3 mm.

The electrode core 12 comprises an anode plate 17, a cathode plate 18 and a separator 19.

The anode plate 17 comprises an anode current collector prepared from a belt-shaped metal foil (such as aluminum foil), and an anode active material layer is coated on at least one side of the anode current collector. The anode active material layer comprises a lithium cobalt oxide (as main component), an anode adhesive, and an anode conductive material. An anode tab 171 is fixed to one side of the anode plate 17 by welding.

The cathode plate 18 comprises a cathode current collector prepared from a belt-shaped metal foil (such as copper foil), and a cathode active material layer is coated on at least one side of the cathode current collector. The cathode active material layer comprises a carbon material (as cathode active material), a cathode adhesive, and a cathode conductive material. A cathode tab 181 is electrically connected with one side of the cathode plate 18. An insulation material layer is provided between the cathode plate 18 and the inner wall of the casing 11 to make them insulate from each other.

The separator 19 is prepared from a porous insulation material, preferably polyethylene, polypropylene, or composite film thereof.

The electrolyte comprises a lithium salt (such as $LiPF_6$) and a mixed solvent (such as a solvent composed of EC, DMC, EMC, and PC mixed at appropriate ratio).

The upper end of the anode tab 171 is protruded upward relative to the electrode core 12, and the lower end of the cathode tab 181 is protruded downward relative to the electrode core 12. The electrode core 12 is accommodated in the casing 11.

Above the electrode core 12, the cover plate assembly 15 is mounted at the open end of the casing 11 to seal the inner space of the battery.

The cover plate assembly 15 comprises a cover plate 151, an insulation member 152, and a rivet 153. A sealed structure is formed by laser welding the cover plate 151 and the casing 11. The rivet 153 is insulated from the cover plate 151 via the insulation member 152, and is electrically connected to the anode tab 171 of the electrode core 12 so as to be used as an anode terminal of the battery.

A top spacer ring 13 provided between the electrode core 12 and the cover plate assembly 15 and a bottom spacer ring 14 provided between the electrode core 12 and the safety device 16 are arranged for preventing short circuit caused by the cover plate assembly 15 simultaneously contacting with the anode and cathode plates of the electrode core 12 and the current interrupting member 161 of the safety device 16 simultaneously contacting with the anode and cathode plates of the electrode core 12.

The cathode plate 18 is electrically connected with the support portion 164 of the safety device 16 via the cathode tab 181 exposed at the lower end of the electrode core 12. The bottom of the casing 11 is welded with the lower surface of the bottom of the hopper-shaped main body 163 of the safety device 16. Therefore the cathode tab 181 is electrically connected with the casing 11 and thus the bottom of the casing, so the bottom of the casing is used as a cathode terminal of the battery.

The cathode tab 181 led out from the electrode core 12 is welded to the support portion 164 of the safety device 16.

When the internal pressure of the battery 10 is increased, the tension force will be applied on the current interrupting member 161 due to pressure increasing action of the electrolyte and gas inside the battery. When the internal pressure rises to a certain degree, the welding structure between the lower surface of the bottom of the hopper-shaped main body 163 of the current interrupting member 161 and the bottom of the casing 11 will be damaged, and the bottom of the hopper-shaped main body 163 is separated from the bottom of the casing 11 to achieve the current interruption and prevent from the safety accident.

Embodiment 2

The difference between the embodiment 1 and embodiment 2 is in that the embodiment 2 adopts another safety device.

Figure 5:
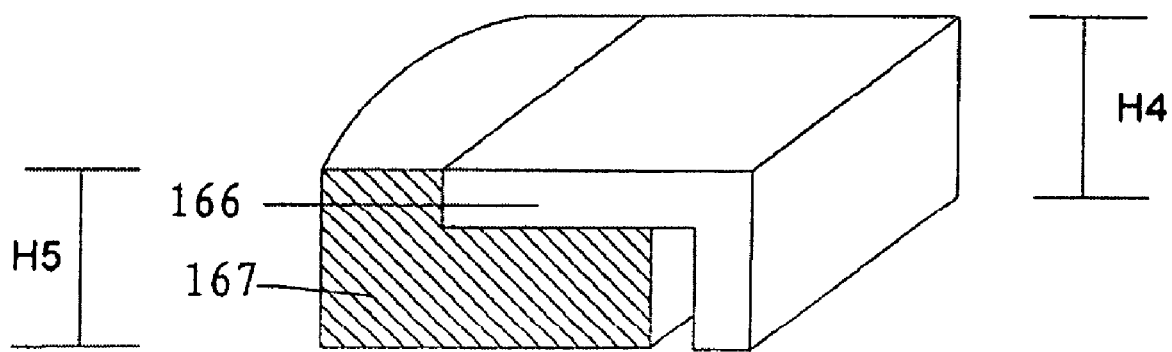
FIG. 5 is a partial perspective view of the safety device in the secondary battery according to another embodiment of the present invention.

FIG. 5 shows a part of the safety device in the embodiment 2. The difference between this safety device and the safety device 16 in the embodiment 1 is in that the current interrupting member 161 in the embodiment 1 is replaced by a reversed L-shaped current interrupting member 166. FIG. 5 is a view only longitudinally taken a part of the holding member 167.

The horizontal portion of the reversed L-shaped current interrupting member 166 is used as the support portion, and the free end of the upright portion of the reversed L-shaped current interrupting member 166 is used as the assembly welding portion. A groove with a shape and size matching with the horizontal portion of the reversed L-shaped current interrupting member is provided in the upper surface of the holding member 167, the depth of the groove is equal to the thickness of the horizontal portion of the reversed L-shaped current interrupting member, and the height H5 of the holding member 167 is equal to the height H4 of the current interrupting member 166.

The cathode tab 181 is welded with the horizontal portion of the reversed L-shaped current interrupting member, and the free end of the upright portion of the reversed L-shaped current interrupting member 166 is welded to the center portion of the inner surface of the bottom of the casing.

When the internal pressure of the battery rises, the tension force will be applied on the current interrupting member 166 due to pressure increasing actions of the electrolyte and gas inside the battery. When the internal pressure rises to a certain degree, the welding structure between the free end of the upright portion of the reversed L-shaped of the current interrupting member 166 and the inner surface of the bottom of the casing will be damaged, the current interrupting member 166 is separated from the bottom of the casing to achieve the current interruption function and prevent from the safety accident.

Two or more current interrupting members 166 may be uniformly arranged on the circumference of the annular holding member 167 according to the detailed conditions, such as breaking strength of the current interrupting member 166, and internal pressure of the battery, etc.

What is claimed is:

1. A secondary battery comprising:
   a cylindrical casing;
   an electrode core;
   an electrolyte accommodated and sealed in the casing, wherein the bottom end of the casing is closed, and the other end of the casing is sealed by an end cover after the electrode core and the electrolyte are filled, and wherein the electrode core comprises an anode plate, a cathode plate, an anode tab, and a cathode tab;
   a safety device mounted between the inner surface of the bottom of the casing and the electrode core; and
   an insulation member between the safety device and the electrode core,
   wherein the safety device comprises a conductive current interrupting member and an insulation holding member,
   wherein the current interrupting member comprises a support portion and an assembly welding portion, wherein the support portion is arranged to support the current interrupting member on the holding member, wherein the assembly welding portion is welded to the inner surface of the bottom of the casing, wherein one of the anode tab and the cathode tab of the electrode core is electrically connected with the support portion of the current interrupting member, and wherein an insulation material is provided between the wall of the casing and the anode plate or cathode plate that is electrically connected with said one of the anode tab and the cathode tab,
   wherein the support portion is fixed on the holding member to support the current interrupting member on the holding member, or the support portion is tightly held between the holding member and the insulation member to support the current interrupting member on the holding member,
   wherein the current interrupting member comprises a hopper-shaped main body, a flange extended outward from the hopper-shaped main body is used as the support portion, and the outer surface of the bottom of the hopper-shaped main body is used as the assembly welding portion, and
   wherein the holding member is in an annular structure, a groove with a size and shape matching with the support portion is provided in the upper surface of the holding member, the groove has a depth equal to the thickness of the support portion, the height of the holding member is equal to the vertical distance between the upper surface of the support portion and the lower surface of the bottom of the hopper-shaped main body, and the assembly welding portion of the current interrupting member is welded to the inner surface of the bottom of the casing through a cavity of the annular structure.

2. The secondary battery according to claim 1, wherein the safety device comprises a plurality of the current interrupting members.

3. The secondary battery according to claim 1, wherein the thickness of the support portion is no less than 0.2 mm, and the thickness of the bottom of the hopper-shaped main body of the current interrupting member is 0.01-1 mm.

4. The secondary battery according to claim 3, wherein the thickness of the bottom of the hopper-shaped main body of the current interrupting member is 0.05-0.3 mm.

5. The secondary battery according to claim 1, wherein the welding strength between the assembly welding portion of the current interrupting member of the safety device and the inner surface of the bottom of the casing is larger than the tensile strength of the current interrupting member.

6. The secondary battery according to claim 1, wherein the welding strength between the assembly welding portion of the current interrupting member of the safety device and the inner surface of the bottom of the casing is smaller than the tensile strength of the current interrupting member.

7. A secondary battery comprising:
   a cylindrical casing;
   an electrode core;
   an electrolyte accommodated and sealed in the casing, wherein the bottom end of the casing is closed, and the other end of the casing is sealed by an end cover after the electrode core and the electrolyte are filled, and wherein the electrode core comprises an anode plate, a cathode plate, an anode tab, and a cathode tab;
   a safety device mounted between the inner surface of the bottom of the casing and the electrode core; and
   an insulation member between the safety device and the electrode core,
   wherein the safety device comprises a conductive current interrupting member and an insulation holding member,
   wherein the current interrupting member comprises a support portion and an assembly welding portion, wherein the support portion is arranged to support the current interrupting member on the holding member, wherein the assembly welding portion is welded to the inner surface of the bottom of the casing, wherein one of the anode tab and the cathode tab of the electrode core is electrically connected with the support portion of the current interrupting member, and wherein an insulation material is provided between the wall of the casing and the anode plate or cathode plate that is electrically connected with said one of the anode tab and the cathode tab,
   wherein the support portion is fixed on the holding member to support the current interrupting member on the holding member, or the support portion is tightly held between the holding member and the insulation member to support the current interrupting member on the holding member, wherein the current interrupting member has a longitudinal cross section in a L shape, a horizontal portion of the L-shaped current interrupting member is used as the support portion, and a free end of an upright portion of the L-shaped current interrupting member is used as the assembly welding portion, and wherein the holding member is in an annular structure, a groove with a size and shape matching with the support portion is provided in the upper surface of the holding member, the groove has a depth equal to the thickness of the support portion, the height of the holding member is equal to the vertical distance between the upper surface of the support portion and the lower surface of the end of the upright portion of the L-shaped current interrupting member, and the assembly welding portion of the current interrupting member is welded to the inner surface of the bottom of the casing through a cavity of the annular structure.

8. The secondary battery according to claim 7, wherein the safety device comprises a plurality of the current interrupting members.

9. The secondary battery according to claim 7, wherein the welding strength between the assembly welding portion of the current interrupting member of the safety device and the inner surface of the bottom of the casing is larger than the tensile strength of the current interrupting member.

10. The secondary battery according to claim 7, wherein the welding strength between the assembly welding portion of the current interrupting member of the safety device and the inner surface of the bottom of the casing is smaller than the tensile strength of the current interrupting member.

* * * * *